March 18, 1952   S. SAMARAS   2,589,630
VALVE STRUCTURE FOR FAUCETS
Filed April 1, 1947
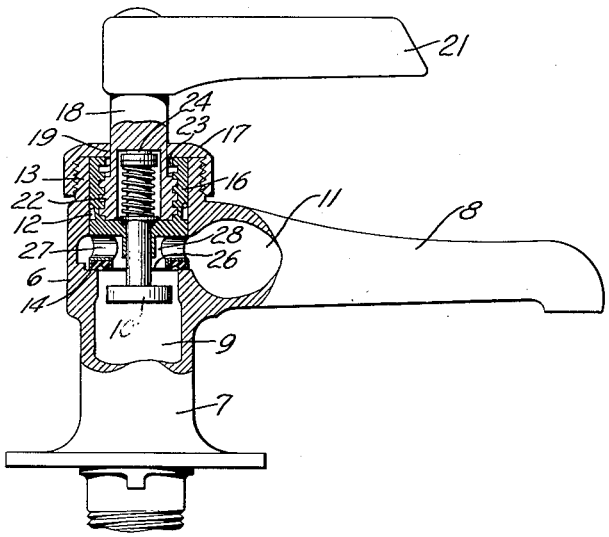
FIG. 1.
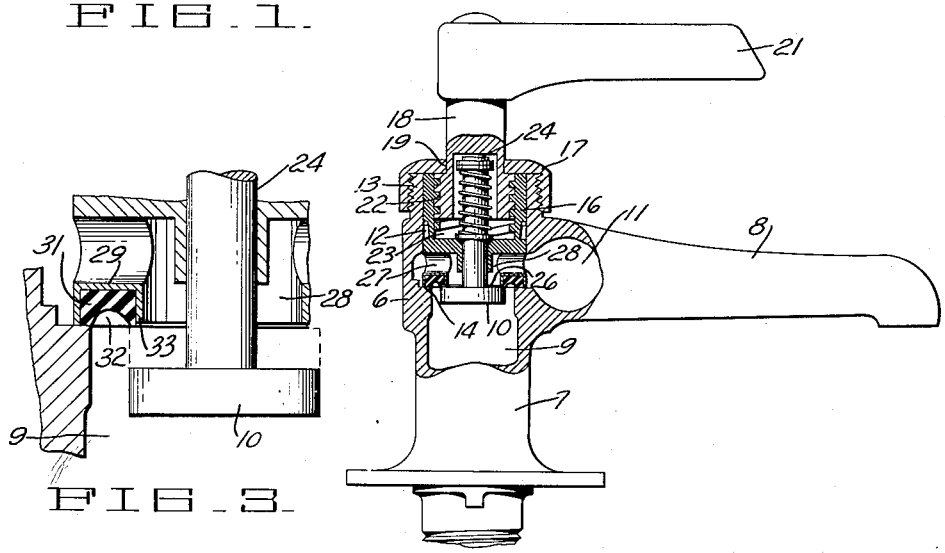
FIG. 3.
FIG. 2.
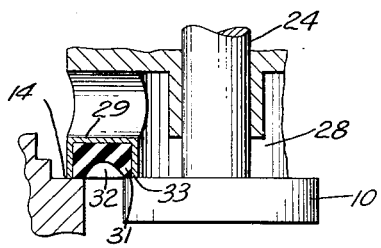
FIG. 4.
INVENTOR
STEPHEN SAMARAS
BY Joseph B. Gardner
his ATTORNEY

Patented Mar. 18, 1952

2,589,630

UNITED STATES PATENT OFFICE 2,589,630

VALVE STRUCTURE FOR FAUCETS

Stephen Samaras, Oakland, Calif., assignor to Samaras Valve Corporation, Oakland, Calif., a corporation of California Application April 1, 1947, Serial No. 738,648

3 Claims. (Cl. 251—27)

This invention relates to faucets and particularly to improvements in the faucet disclosed in my United States Patent No. 2,159,452, issued May 23, 1939.

An object of the invention is to provide a valve construction, for controlling flow in faucets and the like, which is relatively free of the chatter generally apparent in most faucets when the valve is slowly or slightly opened or closed.

Another object of the invention is to provide a valve seat construction in which the shut-off seal member will not deform after extensive use to the point where it will create possible hindrance to or turbulence in the flow of fluid through the faucet.

A further object of the invention is to provide a valved seat construction including a sealing washer which is of only slightly modified common and standard form.

Still another object of the invention is to provide an improved design of cooperative elements forming the flow control valve of a faucet or the like in which the machining operations necessary to form the parts have been reduced to a simplified minimum.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing:

Figure 1 is a view of a faucet, partly in side elevation and partly in vertical section, showing the valve structure of my invention included therein and further showing the valve in open position.

Figure 2 is a view similar to Figure 1 showing the valve in closed position.

Figure 3 is an enlarged scale vertical sectional view of a portion of the valve structure showing the valve in open position.

Figure 4 is a view similar to Figure 3 showing the valve parts in closed position.

The faucet in which I have chosen to illustrate the valve structure of my invention comprises a body 6 having a stem and spout portions 7 and 8 enclosing, respectively, the inlet and outlet ducts 9 and 11. Both ducts open into a bore 12 formed concentrically with the upward extension 13 of the body 6, the inlet duct opening coaxially with and into the lower end of the bore while the outlet duct 11 opens radially thereinto. A shoulder 14 is formed at the junction of the bore and inlet duct due to the fact that the former is considerably larger in diameter than the latter. As set forth in the above-identified patent, I provide a cylindrical valve cage 16 proportioned for slidable entry into and axially of the bore 12, the cage being retained in position against rotative or axial movement by a bonnet 17 overlying the cage and in releasable threaded engagement with the extension portion 13 of the body 6. A rotatable stem 18, projecting upwardly through a suitable aperture 19 provided in the bonnet 17, is provided at its upper end with a handle 21, or other similar grip by means of which the stem may be manually actuated, and has at its lower end screw threads 22 engaging mating threads provided in an axial recess 23 formed in the cage by means of which, when the stem 18 is rotated, a spring-pressed valve stem 24 slidably mounted in the cage may be axially reciprocated. The lower end of the valve cage is provided with a coaxial valve port 26 opening into the inlet duct 9 and radial passages 27, opening into the chamber 28 above the valve port 26, communicate with the outlet duct 11. It will be thus seen that reciprocations of the valve stem will cause opening and closing of the valve port 26 to control fluid flow from the inlet or pressure duct 9 into the outlet duct 11.

The lower end of the valve cage 16 is provided with a circular recess 29, preferably of rectangular cross-sectional form, which is concentric with the cage axis and which contains a seating washer 31 of complemental cross-sectional form provided in its exposed face with a concentric circular groove 32 dividing said face into adjacent annular zones the inner of which borders the valve port 26 and the outer of which overlies the shoulder 14. The axial thickness of the washer 31 is slightly in excess of the similar depth of the recess 29 so that the outer zone of the washer, when the valve cage is urged against the shoulder by screwing down of the bonnet 17, will be compressed against the shoulder and will form a fluid-tight seal precluding the passage of fluid from the pressure duct 9 into the outlet duct 11 when the valve 10 is closed. The inner zone of the washer also extends slightly below the rim 33 bordering the valve port, as shown in Figure 3, to serve as a primary seat for the valve, the yieldability of the washer permitting displacement thereof after engagement with the valve so that the latter, under the influences of the stem spring and the hydrostatic pressure in the inlet duct 9, will move to a secondary and final seat against the metallic rim 33.

The particular action of fluid flow through the valve port and the design of the cooperative valve port and the design of the cooperative valve parts affecting said flow serve to provide quiet, leakproof and extended efficient operation of the faucet. In most faucets wherein the valve-carrying stem, due to guide or thread wear, is capable of a limited amount of free movement, chattering of the valve usually occurs during closing thereof which results in so-called "water-hammer" in the pipes of such loudness and force as to be very annoying. It might be expected that, in the faucet of my design, some chattering could occur due to the fact that the valve stem is capable of a certain amount of axial movement even though such movement is resisted by the stem spring. Such is not the case however since, as will be seen in Figure 3, the fluid flow from the inlet duct 9 will pass upwardly over the periphery of the valve and will be directed into the groove 32 which will deflect the flow downwardly against the upper or seating face of the valve thus resisting the pressure of the fluid in the duct 9 tending to force the valve to its closed position. Counter-pressures are thus imposed on the valve substantially balancing the latter. As the valve is closed, the force of flow directed against the upper face of the valve will correspondingly decrease but since the upper end of the stem 24 is bearing against the screw-threaded stem 18, the pressure of fluid against the lower face of the valve will hold the latter against vibration until the valve is fully closed. After the valve has engaged the inner zone of the rubber ring 31, fluid flow from the duct 9 will stop even though the valve still has a small distance to travel, as indicated by the dotted line position thereof in Figure 3, before finally seating on the rim 33 and effecting the secondary closure of the valve. In usual faucet construction, where a valve repeatedly seats against a rubber seating surface only, the mass of rubber including said seating surface will gradually lose some of its resilience and will flow to assume a permanent deformation consisting usually of a ridge bordering the valve seat which may sometime rise sufficiently to cause undesirable impedence to or turbulence in the flow of fluid through the valve. In the structure of my invention, the compression of the rubber seating ring is very slight, in the order of a few thousandths of an inch, and consequently the unwanted deformation of the ring may not occur. Formation of the ridge is further counteracted in my structure by proportioning the groove 32 so that its inner marginal edge does not project radially outwardly beyond the periphery of the valve 10.

The valve structure lends itself remarkably well to rapid machine production since all parts of the apparatus comprising the valve proper are capable of formation by straightaway rectangularly related machine cuts. Such operations contribute to the production of accurately finished aligned and properly interfitting parts so that assembly is greatly expedited and the percentage of rejected parts is reduced to a negligible degree.

I claim:

1. In a faucet or similar flow control device comprising a housing enclosing an inlet duct for fluid and including a body element provided with a port communicating with said inlet duct and bordered by a plane seating surface disposed transaxially of said port, a ring of yieldable material concentric with said port having a portion thereof interposed between confronting surfaces of said housing and body element to provide a fluid-tight seal therebetween, said ring having another portion thereof exposed in said duct to provide a seating surface disposed in planar offset relation to the port seating surface, means on said ring seating surface for deflecting fluid entering said duct away from said surface, and a movable valve overlying said port and having a seating surface complemental to and engageable successively with said ring seating surface and said port seating surface when said valve is moved toward said port.

2. In a faucet or similar flow-control device comprising a housing enclosing an inlet duct for fluid and including a body element provided with a port communicating with said inlet duct and bordered by a plane seating surface disposed transaxially of said port, a ring of yieldable material concentric with said port having a transaxial surface facing said inlet duct, said surface being formed with a circular groove defining a radially outer portion of said ring whereby fluid entering said duct will be deflected from said surface, interposed between confronting surfaces of the housing and body element to provide therebetween a fluid-tight seal, and a radially inner portion of the ring providing a seating surface disposed in planar offset relation to the port seating surface, and a movable valve overlying said port and having a seating surface complemental to and engageable successively with said ring seating surface and said port seating surface when said valve is moved toward said port.

3. In a faucet or similar flow-control device comprising a housing enclosing an inlet duct for fluid and including a body element provided with a port communicating with said inlet duct and bordered by a plane seating surface disposed transaxially of said port, a ring of yieldable material concentric with said port having a transaxial surface facing said inlet duct, said surface being formed with a circular groove of substantially semi-circular cross-sectional form defining a radially outer portion of said ring, interposed between confronting surfaces of the housing and body element to provide therebetween a fluid-tight seal, and a radially inner portion of the ring providing a seating surface disposed in planar offset relation to the port seating surface, a movable valve overlying said port and having a seating surface complemental to and engageable successively with said ring seating surface and said port seating surface when said valve is moved toward said port, and said groove being disposed to receive and direct a portion of the flow of fluid from said inlet duct toward said valve seating surface.

STEPHEN SAMARAS.

REFERENCES CITED

The following references are of record in the file of this patent:

UNITED STATES PATENTS

| Number | Name | Date |
| --- | --- | --- |
| 565,682 | Jenkins | Aug. 11, 1896 |
| 802,490 | Bashlin | Oct. 24, 1905 |
| 1,033,325 | Keiser | July 23, 1912 |
| 1,667,580 | Albrecht | Apr. 24, 1928 |
| 2,151,442 | Roberts et al. | Mar. 21, 1939 |
| 2,253,371 | Fisher | Aug. 19, 1941 |
| 2,481,460 | Williams | Sept. 6, 1949 |

FOREIGN PATENTS

| Number | Country | Date |
| --- | --- | --- |
| 1,859 | Great Britain | of 1878 |
| 189,740 | Switzerland | of 1939 |